United States Patent [19] [11] 4,346,759
Cohen et al. [45] Aug. 31, 1982

[54] HEAT RECLAIMING SYSTEM

[75] Inventors: Kenneth W. Cohen, Harrington Park; George P. Mansey, Hillsdale, both of N.J.

[73] Assignee: Aerco International, Inc., Northvale, N.J.

[21] Appl. No.: 127,427

[22] Filed: Mar. 5, 1980

Related U.S. Application Data

[63] Continuation-in-part of Ser. No. 894,835, Apr. 10, 1978, Pat. No. 4,256,176.

[51] Int. Cl.³ ............................................... F28D 7/10
[52] U.S. Cl. .................................................... 165/163
[58] Field of Search ............................ 165/78, 86–90, 165/163, 164, 156

[56] References Cited

U.S. PATENT DOCUMENTS

| | | | |
|---|---|---|---|
| 2,256,882 | 9/1941 | Sebald | 165/78 X |
| 2,843,367 | 7/1958 | Bogus et al. | 165/78 |
| 3,690,374 | 9/1972 | Vollhardt | 165/163 |
| 3,871,444 | 3/1975 | Houser et al. | 165/163 |

*Primary Examiner*—Samuel Scott
*Assistant Examiner*—Theophil W. Streule, Jr.
*Attorney, Agent, or Firm*—Brumbaugh, Graves, Donohue & Raymond

[57] ABSTRACT

A heat-reclaiming system is especially adapted for reclaiming heat from used laundry water. It comprises a heat exchanger providing for heat transfer from warm used laundry water to cold incoming water intended for use as fresh laundry water. The heat exchanger is formed with interior ducts and an outer shell. The interior ducts, preferably concentric coils hydraulically in parallel, define a space for the transport through the heat exchanger of the cold incoming water. The outer shell encloses the ducts, and the ducts and shell together define a space providing for the transport through the heat exchanger of the warm used laundry water. The flows of the warm and cold water through the heat exchanger are generally in opposite directions. Maximum heat-transfer efficiency is accomplished by simultaneously pumping both the shell and the duct sides of the exchanger at design flow condition, and maximizing the log mean temperature difference across the heat exchanger.

The heat exchanger is mounted above a pit that stores the used laundry water before it is introduced into the heat exchanger. The shell is a roll-away design, and carries a pit cover plate that normally covers the pit but exposes the pit when the shell is removed. This minimizes heat loss from the pit during operation, while allowing for wash-down directly into the pit when the shell is removed during scheduled cleaning periods. The movable shell portion can be rolled away without breaking any pipe connections.

4 Claims, 7 Drawing Figures

4,346,759

HEAT RECLAIMING SYSTEM

BACKGROUND OF THE INVENTION

This is a continuation-in-part of Cohen application Ser. No. 894,835 filed Apr. 10, 1978 for HEAT-RECLAIMING SYSTEM, now U.S. Pat. No. 4,256,176.

This invention relates to heat reclaiming and, more particularly, to a novel and highly-effective system that is particularly adapted for use in reclaiming heat from used laundry water.

Energy conservation is of extreme and growing importance because of a nationwide and indeed a worldwide present and projected shortage of energy. This invention contributes towards energy conservation by reclaiming a substantial portion of the heat in laundry water which is now customarily wasted when the used laundry water is discharged.

In both home and commercial laundries, hot water is typically used for the washing of clothing. The thermal energy required to heat water to a temperature of, say, 180° F. from an initial temperature of, say, 50° F. is considerable, since the specific heat of water (1.0) is relatively high. A great deal of fuel, usually oil or gas, is consumed for this purpose. During the washing cycle, some heat is inevitably lost to the surroundings, but at the end of the washing cycle the temperature of the used laundry water may still be, say, 125° F. or more. When this relatively warm water is drained into a septic tank or sewer, a great deal of potentially recoverable heat is irretrievably lost.

SUMMARY OF THE INVENTION

An object of the invention is to remedy the problem outlined above, and, in particular, to provide for the recovery of large amounts of heat from used laundry water.

Another object of the invention is to provide a heat exchanger of high efficiency that is constructed in such a manner as to facilitate cleaning thereof.

The foregoing and other objects are attained in accordance with the invention by providing a heat-reclaiming system comprising a heat exchanger facilitating heat transfer from relatively warm used laundry water to relatively cool incoming water intended for use as fresh laundry water. The heat exchanger comprises interior ducts or tubes and an outer shell. The interior ducts define a space for the transport through the heat exchanger of either the warm used laundry water or the cool incoming water. In the preferred embodiment of the invention, the cool incoming water flows through the interior ducts. The outer shell encloses the ducts during operation of the system, and the ducts and the shell together define a space during operation of the system providing for the transport through the heat exchanger of the other of the two fluids: i.e., in the preferred embodiment of the invention, in which used laundry water is one of the two fluids involved in the heat-exchange process, the warm used laundry water flows through the shell around the ducts mentioned above. Additional ductwork or baffles, etc. may be provided to ensure that the flows of the warm and cool water through the heat exchanger are generally in opposite directions in order to improve the efficiency of the heat-exchange process, as explained in greater detail below. The two defined spaces for the warm and cool water are, of course, hydraulically isolated from each other to prevent commingling of the used laundry water and the fresh incoming water in the heat exchanger.

The system also comprises a sump or pit immediately below the heat exchanger for collecting the laundry water after use and before introduction into the heat exchanger and a plate covering the pit to reduce heat loss from the pit during operation of the system and uncovering the pit to allow wash-down of the heat exchanger directly into the pit during scheduled cleaning periods.

The construction is such as to permit opening of the het exchanger and simultaneous uncovering of the pit. Specifically, the shell is formed in two mating sections, one stationary and the other movable. Preferably access to the pit and the interior of the heat exchanger is provided by means movably mounting both the plate and the movable portion of the shell, whereby the shell and the plate are easily movable as a unit, for example on wheels or roller bearings, between the closed and open positions.

In the open position, the movable portion of the shell is located immediately to one side of the ducts. The movable portion of the shell in the open position has generally the shape of a cylinder closed at one end and open at the other, and the open end is disposed adjacent to the ducts, whereby the draining of the wash-down water (which is sprayed onto the ducts and shell) into the pit is facilitated.

The ducts preferably define a plurality of concentric coils hydraulically in parallel. A first inlet admits the cool fresh water to the heat-exchanger coils, another inlet admits the warm used laundry water to the heat exchanger in the space around the coils, one outlet withdraws the relatively cool water from the coils after heating, and another outlet withdraws the relatively warm water from the space around the coils after cooling. Both of the inlets and both of the outlets penetrate only one of the two shell sections (viz., the stationary section) and are mounted in cantilever fashion. The shell can therefore be opened for cleaning of the interior of the heat exchanger by removing the other of the sections (viz., the movable section) and without disturbing any of the inlet and outlet connections.

The cool fresh water upon admittance to the heat exchanger is first brought into heat-exchange relation to the relatively warm used laundry water just prior to the exit of the latter from the heat exchanger, and the relatively warm used laundry water upon admittance to the heat exchanger is first brought into heat-exchange relation to the fresh water just as the latter flows out of the heat exchanger. Throughout the heat exchanger, in fact, the flows of the relatively cool and relatively warm fluids are generally counter to each other.

The coils are designed for substantially equal pressure drops along the length of each coil, and independent pumps are provided for the two fluids, so that the heat exchanger can be operated always at design flow conditions. By these means, the log mean temperature difference across the heat exchanger is maximized. This maximizes the efficiency of the heat-exchange process.

The concentric coils formed by the heat-exchanger ducts are staggered so that the exterior of each coil is partially exposed when the shell is opened to permit cleaning. Since the coils are hydraulically in parallel, isolation (plugging) of failed coils is possible, thereby enabling continued operation of the heat exchanger even in case of total failure (rupture) of one or several coils.

BRIEF DESCRIPTION OF THE DISCLOSURE

A better understanding of the invention can be gained from a consideration of the following detailed description of the preferred embodiments thereof, in conjunction with the appended figures of the drawings, wherein.

Figure 2:
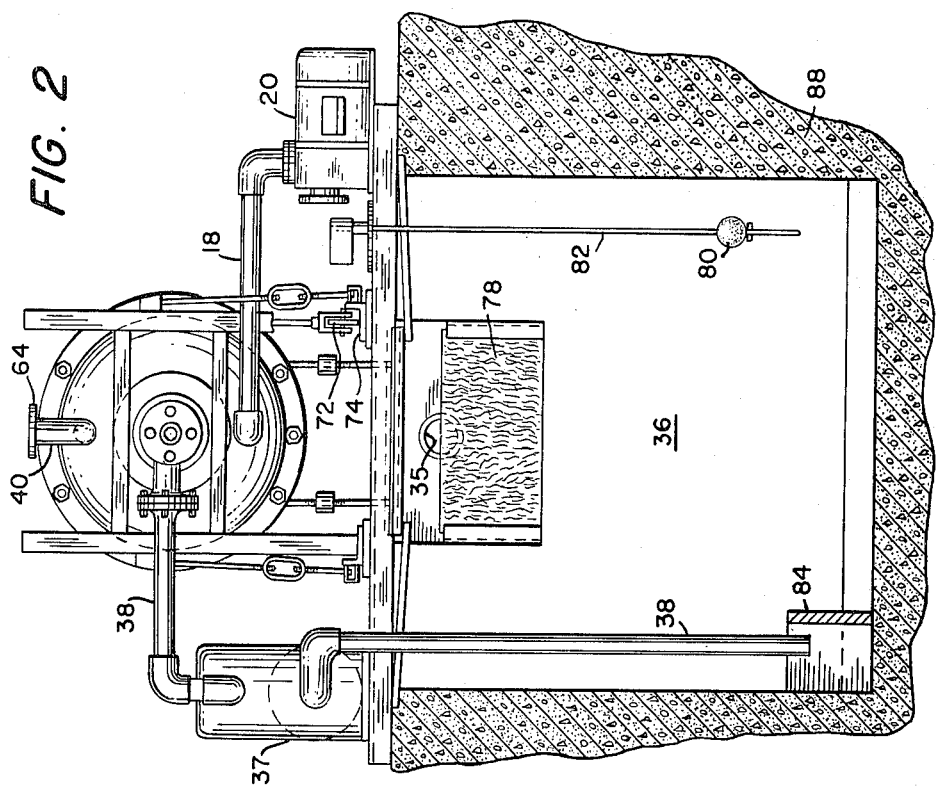
FIG. 2 is a view in end elevation of a portion of the apparatus shown schematically in FIG. 1.
Figure 1:
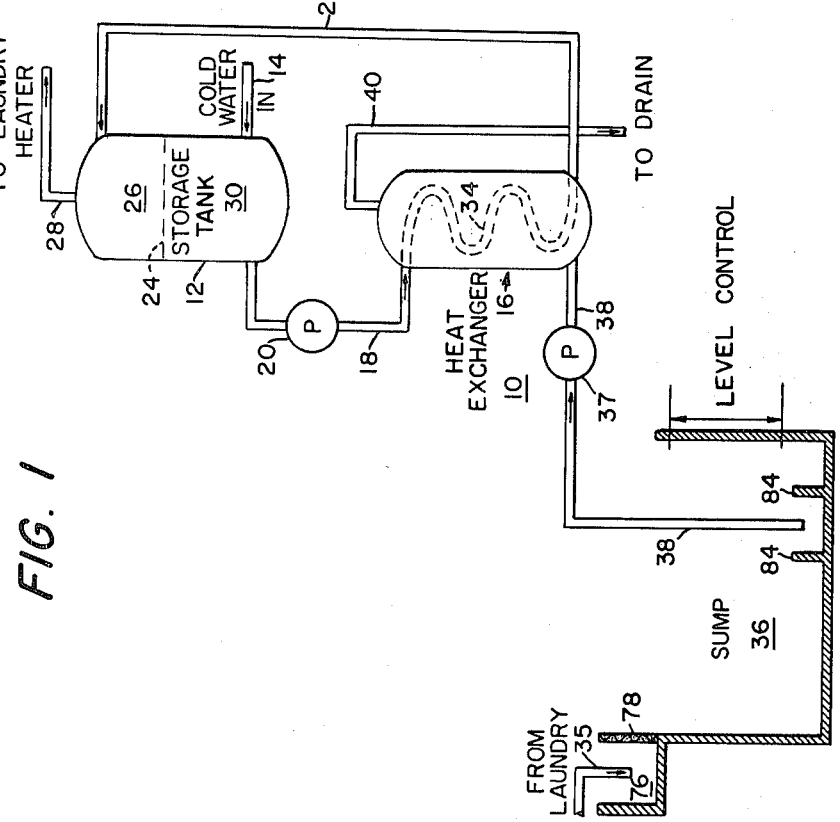
FIG. 1 is a schematic view of a preferred embodiment of apparatus constructed in accordance with the invention.
Figure 3:
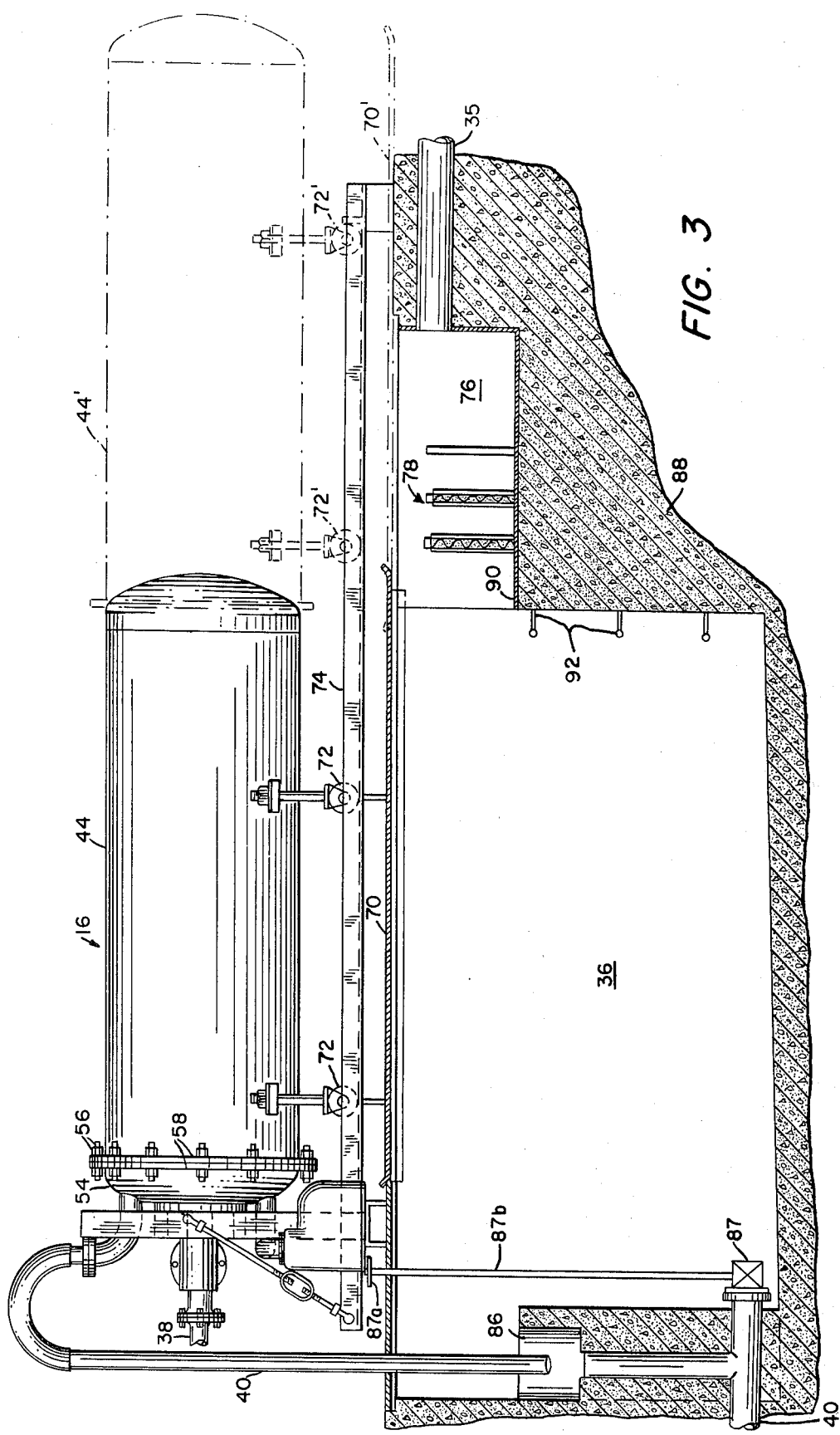
FIG. 3 is a view in side elevation of the apparatus of FIG. 2.
Figure 4A:
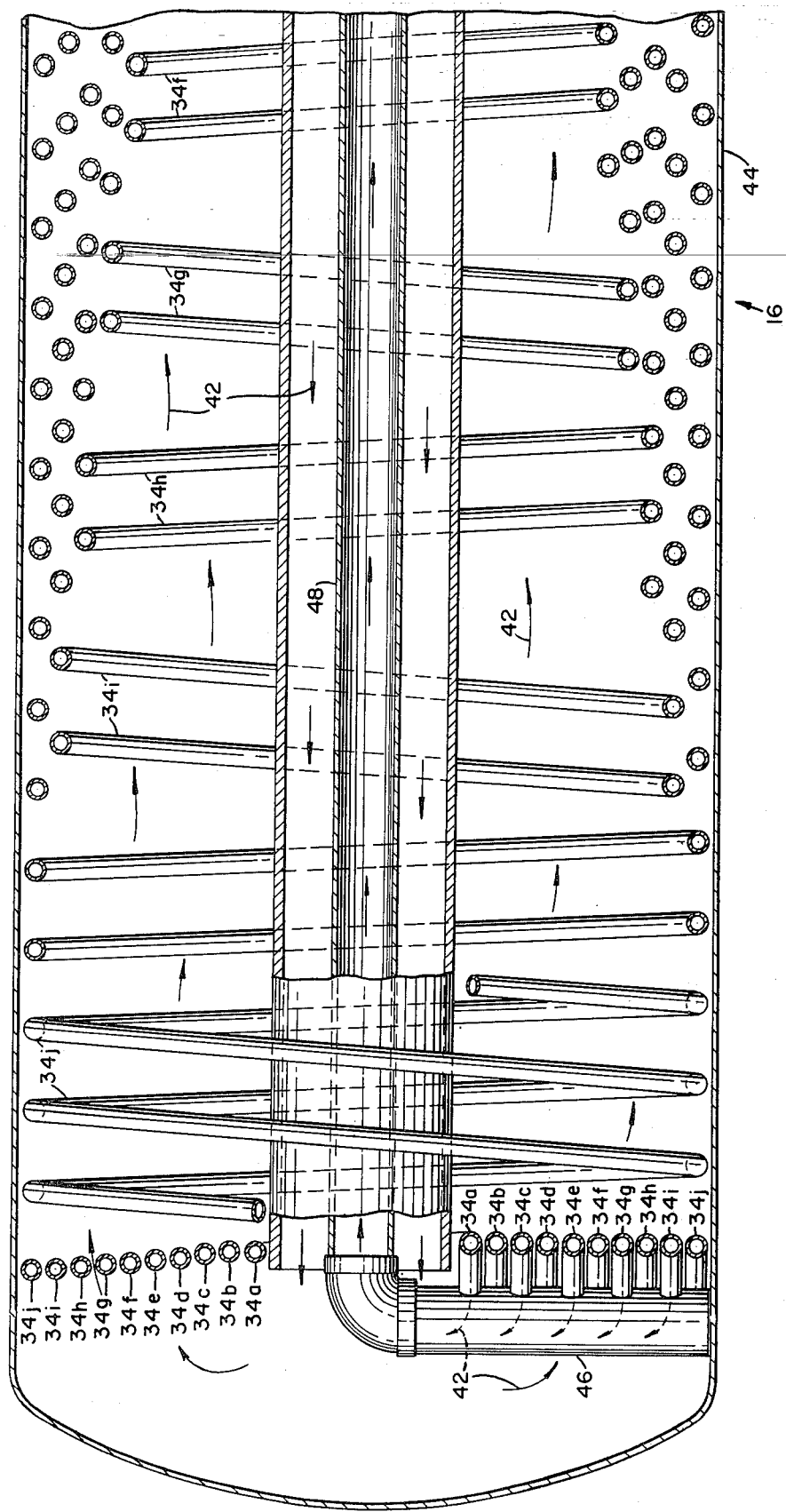
Figure 4B:
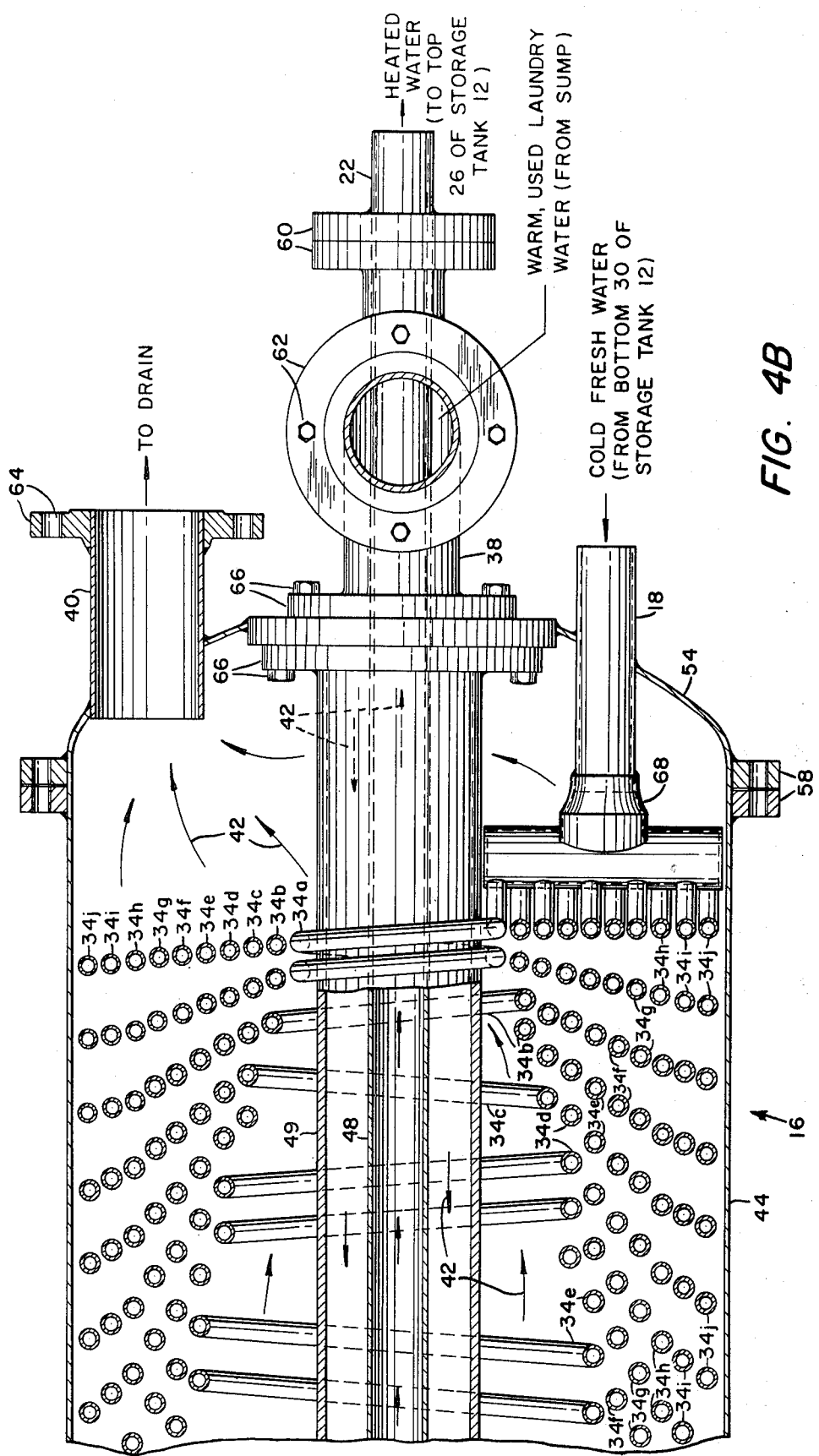

FIGS. 4A and 4B, when arranged with FIG. 4A to the left of FIG. 4B, are a sectional view showing the interior of a portion (viz., the heat exchanger) of the apparatus shown in FIGS. 1-3.

Figure 5:
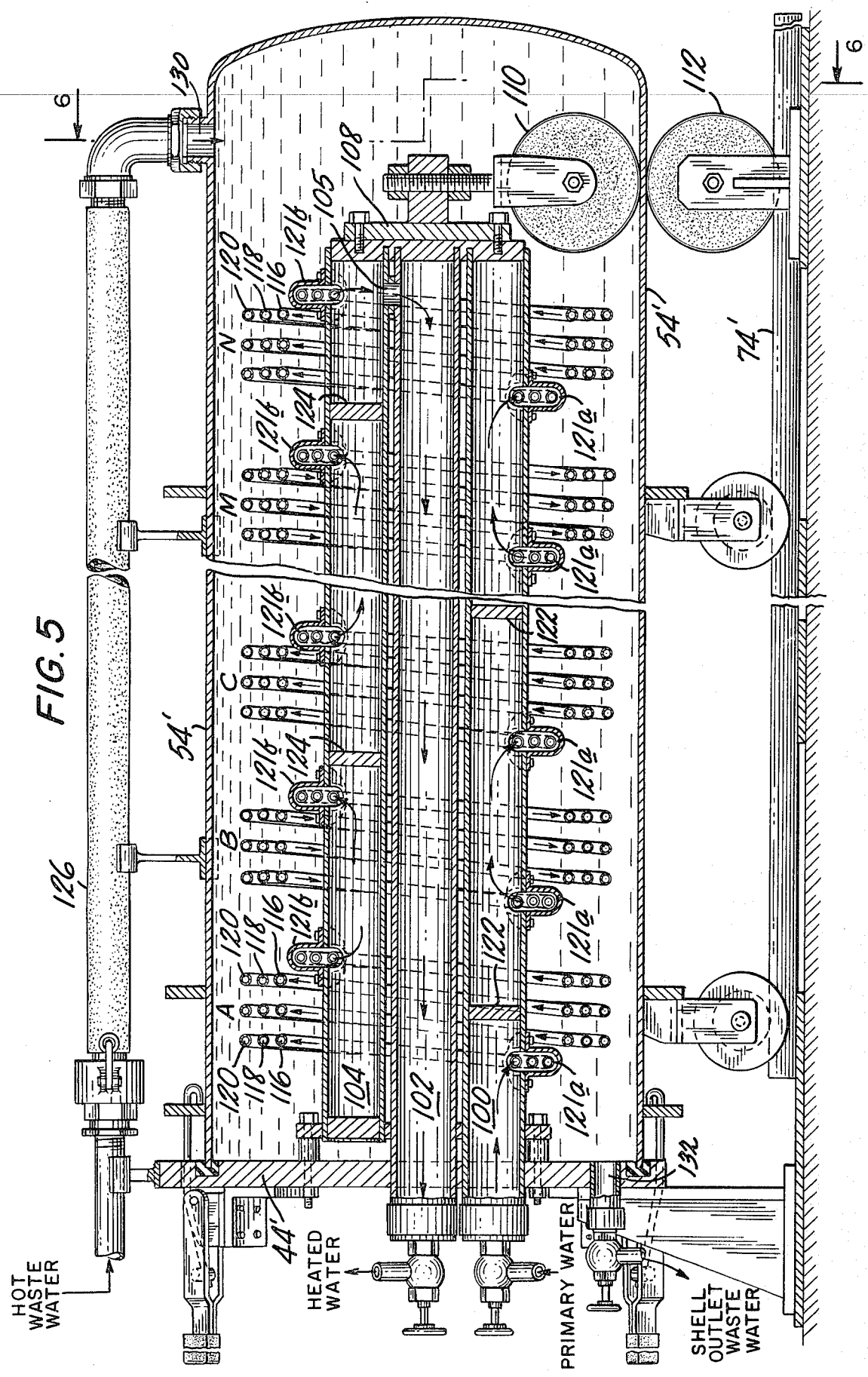
Figure 6:
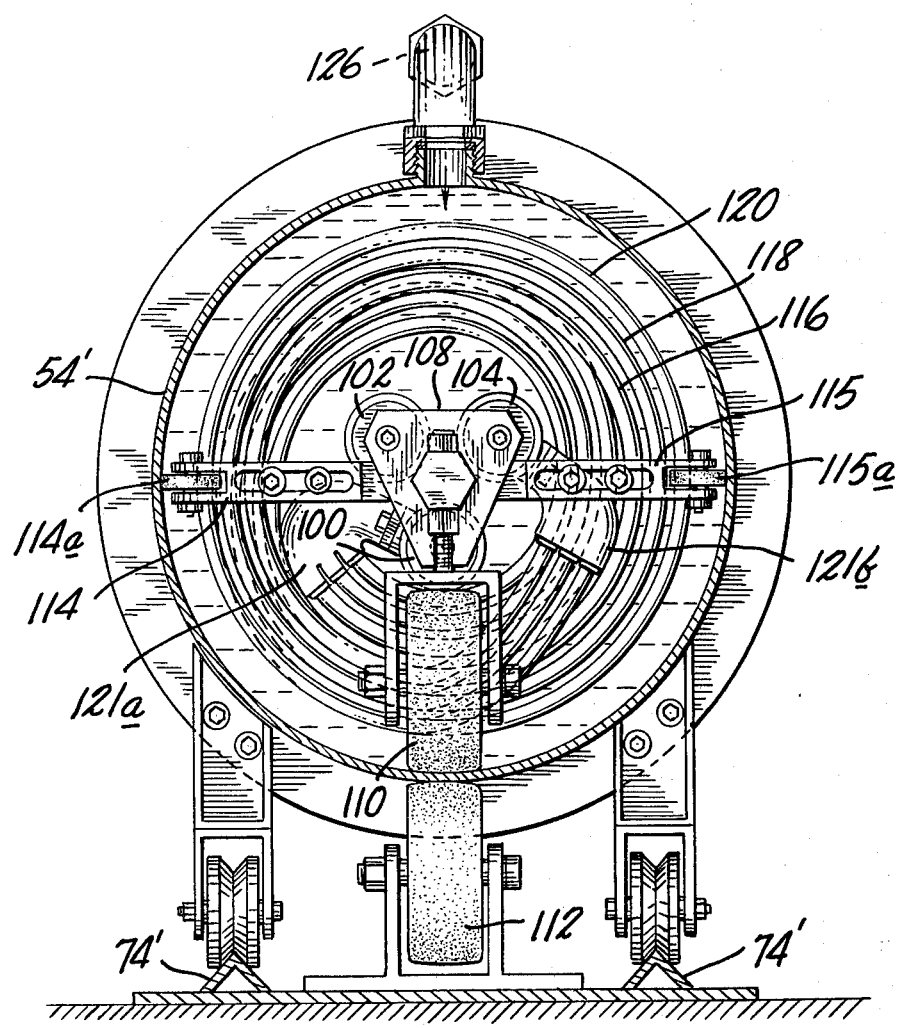

FIGS. 5 and 6 are a schematic view of an alternative embodiment of the present invention.

DESCRIPTION OF THE PREFERRED EMBODIMENTS

FIG. 1 shows apparatus 10 constructed in accordance with the invention and intended to be used in combination with a laundry comprising one or more conventional clothes-washing machines (not shown) in a home, apartment, hsopital, or military or commercial installation. Cold water is introduced into a storage tank 12 through an inlet line 14. A heat exchanger or reclaimer 16 constructed in accordance with the invention preheats cold water drawn from the storage tank 12 through a line 18 by a pump 20. The preheated water is supplied through a line 22 back to the storage tank 12. The preheated water is less dense than the cold water, and hence floats on the cold water in the storage tank 12.

The line of demarcation 24 between the preheated and the cool water moves up and down in the tank 12 during different parts of the cycle of operation of the washing machine or machines. Specifically, the washing machine or machines periodically draw preheated water from the top portion 26 of the storage tank 12 through a line 28 and a laundry heater (not shown), the latter being provided in order further to raise the temperature of the preheated water to the temperature required for the washing machines. As preheated water is thus withdrawn from the top portion 26 of the storage tank 12, cold water enters the bottom portion 30 of the storage tank 12 through the line 14, and the line of demarcation 24 rises. On the other hand, during periods when the washing machine or machines do not draw preheated water from the tank 12 and the pump 20 is in operation, cold water is withdrawn from the bottom portion 30 of the storage tank 12, circulated through the heat exchanger 16, and returned via the line 22 to the top portion 26 of the tank 12 as preheated water, so that the line of demarcation 24 falls.

In the heat exchanger 16, the cold water introduced by the line 18 is circulated through interior duct means indicated schemtically in FIG. 1 by the dotted lines 34. As FIGS. 4A and 4B show, the interior duct means 34 preferably comprises a plurality of concentric coils 34a through 34j hydraulically in parallel. The heat exchanger or reclaimer 16 is so constructed that the cold incoming water flowing in the coils 34a through 34j flows in a direction generally counter to the direction of flow of the warm used laundry water. The latter comes from the laundry through a line 35 (FIGS. 1–3) into a sump or pit 36, is propelled by a pump 37 through a line 38 into the heat exchanger 16, and exits from the heat exchanger 16 through a drain line 40. The flow directions are readily apparent in the schematic (FIG. 1) and are indicated by arrows 42 in FIGS. 4A and 4B.

The coils 34a through 34j may all coil in the same direction, but are preferably, as shown, alternately right handed and left handed (i.e., of Z and S configuration). Thus the coils 34a 34c, 34e, 34g and 34i may be right handed, and the coils 34b, 34d, 34f, 34h and 34j left handed, or vice versa. The pitch of each coil, the spacing between coils (i.e., the coil diameters), the inside diameters of the pipes of which the coils are made, and the lengths of the respective coils are such that the pressure drop across each coil is the same. The inner coils make relatively tight bends compared to the outer coils, so that, other factors such as pipe diameter being the same, the inner coils have a greater pressure drop per unit of length than the outer coils. This is compensated for by, for example, making the flow paths through the outer coils longer than those through inner coils. At the same time, the pitch of the several coils is related to the respective coil diameters in such a manner that the coils are staggered: i.e., the exterior of each coil is partially exposed for cleaning by a high-pressure hose when the movable outer shell portion 44 (FIGS. 3 and 4A and 4B) of the heat exchanger 16 is removed to the broken-line position 44' shown in FIG. 3.

In accordance with the invention, the log mean temperature difference across the heat exchanger 16 is maximized, thereby maximizing the efficiency of the heat-exchange process. This is accomplished by the special structure of the apparatus of the invention, including the counterflow feature and the independent pumps 20 and 37. Thus where the water to be preheated is at its coldest, namely at the right ends of the coils 34a through 34j (FIG. 4B), it absorbs heat from the used laundry water just prior to the discharge of the latter to the drain line 40. This is the point where the used laundry water is at its coolest in the heat exchanger 16. Similarly, where the water to be preheated is at its warmest in the heat exchanger, namely as it flows from the manifold 46 (FIG. 4A) and along the straight pipe 48 (FIGS. 4A and 4B) to the pipe 22 (FIG. 4B), it is in heat-exchange relation with the water from the laundry pit or sump 36 when the latter is at its hottest in the heat exchanger 16, namely as it flows through the space defined by the straight pipe 48 and a baffle 49 concentric therewith. Thus at all points in the heat exchanger 16 there is a temperature gradient favoring heat transfer from the relatively warm used laundry water to the relatively cool incoming water; at no point does the temperature gradient vanish or assume a polarity or direction opposite the one intended. Moreover, there is a minimal variation in the temperature difference between the two fluids at all points along the heat exchanger 16. Since the pumps 20 and 37 are operated independently, both flows through the heat exchanger 16 are controllable independently. By maintaining design flow conditions for both the shell side and the duct side of the heat exchanger 16, the logarithm of the average temperature difference between the warm, used laundry water and the cold incoming water at each point in the heat exchanger 16 is maximized, thus maximizing the efficiency of the system.

In a typical laundry installation, the average water temperature in the washing machines may be, for example, 180° F., while the temperature of the cold incoming water may be, for example, 50° F. If the temperature of the used laundry water entering the heat exchanger 16 is 125° F., the temperature of the water leaving the heat exchanger 16 via the drain 40 is 84.7° F., and the temperature of the water leaving the duct 48 via the line 22 is 105° F., then a 42% fuel savings may be realized. These conditions are easily met in accordance with the present invention with a heat-exchange area of 150 ft².

The calculation is as follows: The fuel savings, expressed as a percentage, equals the quantity of heat reclaimed (e.g., in BUTs per hour) divided by the quantity of heat required (in BTUs per hour). That is, $$\frac{Qt \times \Delta Tt \times 500}{2 \text{ gallons/lb} \times \text{lb} \times 1/60 \times \Delta T_L \times 500} = \frac{\Delta Tt}{\Delta T_L},$$

where $\Delta Tt = \Delta T$ in °F. of the cold incoming water in its passage through the heat exchanger 16 and $\Delta T_L = \Delta T$ between the water entering the washing machines and the cold incoming water at the inlet to the heat exchanger 16. The fuel savings are thus $(105-50)/(180-50) = 42\%$.

In addition to the movable shell section 44, the shell is formed with a mating stationary section 54 (FIGS. 3 and 4B). Both of the inlets 18 and 38 and both of the outlets 22 and 40 penetrate only the stationary section 54. The duct means constituted by the coils 34a through 34j are mounted within the shell sections 44 and 54 in cantilever fashion, and provide no structural support for any other part of the system. The sections 44 and 54 are removably secured together by fastening means such as nuts and bolts 56 (FIG. 3) along flanges 58 (FIGS. 3 and 4B). The nuts and bolts 56 can be removed so that the shell sections 44 and 54 can be separated for cleaning of the coils 34a through 34j and the interior of the shell without disturbing any of the pipe connections. However, additional connections 60, 62, 64, 66 and 68 provide for ease of assembly and for the rare case where total disassembly is required (for example, in case of replacement of the entire system).

The apparatus of the invention is characterized by a number of additional features that contribute to its efficient operation. Thus the movement of the shell section 44 to its position 44' and of the plate 70 to its position 70' (FIG. 3) is facilitated by movably mounting the shell section 44 and plate 70 on access means comprising roller bearings or trolley wheels 72. The roller bearings or wheels 72 roll on guides 74 which are mounted in a stationary manner with respect to the apparatus 10.

Moreover, the pit or sump 36 is formed with a portion 76 equipped with sheet catcher and filter means 78 for filtering the used laundry water to remove lint, etc., prior to the introduction of the water to the sump 36 proper.

A level control, indicated schematically in FIG. 1, comprises a float 80 (FIG. 2) connected to an actuating arm 82 which actuates limit switches (not shown) controlling the pump 37. In this way, the level of liquid in the sump 50 is maintained between upper and lower limits as indicated schematically in FIG. 1.

The lower end of the suction line 38 extends below a dam 84, as indicated in FIGS. 1 and 2, and the drain 40 is constructed to accept overflow from the sump 36, as indicated at 86 (FIG. 3), in case the level control fails to maintain the level within the sump 50 at or below the intended upper limit. Moreover, the drain 40 communicates with the sump 36 through a valve 87 (FIG. 3) controlled by a wheel 87a and rod 87b. This facilitates draining the sump 36 in connection with the wash-down procedure.

The sump 36 may be formed of concrete, as indicated at 88 in FIGS. 2 and 3, and the portion 76 may include a metal liner 90. The bottom of the sump 36 preferably slopes toward the valve 87 and drain 40, as indicated in FIG. 3, and a ladder 92 may be provided to permit access to the sump for scrubbing and servicing.

Thus there is provided in accordance with the invention a compact counterflow heat exchanger that affords a large heat-exchange surface in a small space. The heat exchanger incorporates a cantilevered design that isolates the shell section 44 from a role in mechanical support. The roll-away shell portion 44 enhances exchanger serviceability in that it is unnecessary to break pipe connections for servicing. Any specific coil 34a through 34j can be isolated (plugged) so that a failure of one or several coils will not disable the system. Any suitable material—e.g., copper, stainless steel, plastics, etc.—can be used for the construction of the heat exchanger. The filters and sheet catcher prevent lint buildup in the pit, minimizing down time.

An alternate embodiment of the heat reclaimer of the present invention is shown schematically in FIGS. 5 and 6. Components of the reclaimer which correspond to those of the FIGS. 1-4B embodiment are indicated by prime numbers. The reclaimer of FIGS. 5 and 6 differs principally from the reclaimer of FIGS. 1-4B in the configuration of the heat transfer coils, the configuration of the piping which communicates with the coils, the manner in which the laundry water is supplied to the shell, and finally, in the provision of a support for the free end of the duct means, namely, the coils and piping.

In particular, the reclaimer of FIGS. 5 and 6 includes three pipes 100, 102 and 104 which extend from the fixed shell section 44' through the length of the removable shell 54'. Pipe 100 is an input pipe, receiving the cold fresh water from the storage tank, and pipe 102 is an output pipe supplying the heated water to the top of the storage tank. Pipe 104 is closed at both ends, and, through a pipe 105, joins the pipe 102 at the end farthest removed from the shell 44'.

At their ends farthest removed from the fixed shell section 44', the pipes are secured to a bracket 108. In turn, the bracket 108 is secured to a roller 110 which rides on the inner surface of shell 54'. A roller 112 is located between the rails 74', and has a height such that the shell 54' will pass between it and the roller 110. A pair of rigid bars 114 and 115 (FIG. 6) project radially from the bracket 108. They carry rollers 114a and 115a which act to guide the shell 54' in its axial movement toward and away from the fixed shell section 44'.

The heat transfer coils are arranged in sections A, B ... M,N. Each section comprises three helically coiled and open-ended tubes 116, 118 and 120 which surround pipes 100, 102 and 104, and are arranged to communicate at their left and right open ends (as viewed in FIG. 5) with manifolds 121a and 121b, which are joined to the pipes 100 and 104, respectively. In section A, thus, the left open ends of the three coiled tubes 116, 118 and 120 are connected through manifold 121a to the input pipe 100, and the right ends of the tubes are connected through manifold 121b to the pipe 104. Likewise, in section B, the left ends of the tubes 116, 118 and 120 are connected through manifold 121a to the pipe 100, while the right ends of the tubes are connected through manifold 121b to the pipe 104. This arrangement continues through the last section N. There, the now heated water discharged from the tubes into the pipe 104 flows into the outlet pipe 102.

In order to achieve counterflow of the water to be heated within the coils and thereby enhance the transfer of heat from the laundry water, discs 122 and 124 are selectively positioned within the pipes 100 and 104 to block the flow of water. The discs 122 and 124 are separated by a distance of two sections in each of the pipes 100 and 104, respectively, and are offset from each other by the length of a coil section. This arrangement provides for a counterflow or reversal in water direction in every other section.

In the embodiment of FIGS. 1–4B, the warm laundry water is supplied through a pipe which extends within the movable shell section 54. In the FIGS. 5 and 6 embodiment, the warm laundry water is supplied to a fitting mounted on the fixed shell 44', and thence to a hose 126 which extends outside the movable shell section 54'. The hose 126 is coupled at its other end of the movable shell section 54' at a point which is just beyond the last coil section N in the reclaimer. As in FIGS. 1–4B, the laundry water is discharged into the drain through the fixed shell section 44'. As a further difference between embodiments, in the FIGS. 5 and 6 embodiment, the movable shell 54' is removably clamped to the fixed shell section 44'.

In the operation of the reclaimer of FIGS. 5 and 6, the removable shell section 54' is moved axially toward the fixed shell section 44' and clamped thereto in liquid-tight relation. Hose 126 is secured to the fitting on the fixed shell, and warm laundry water is discharged into the shell and over the coils.

Cold water from the storage tank enters the pipe 100 through the fixed shell section 44'. In pipe 100, blocked by disc 122 from travel through the pipe, all the primary water is supplied simultaneously through manifold 121a to the left open ends of the coiled tubes 116, 118 and 120 in section A. The cold water courses counterclockwise through the coils 116, 118 and 120, and is discharged via manifold 121b into the pipe 104. Blocked by disc 124 from passage through the pipe 104, all the water discharged from the coils in section A then flows into the manifold 121b and the right open ends of the tubes 116, 118 and 120 in section B. In section B, the water courses through the coiled tubes in a clockwise direction, and is discharged into pipe 100 via the manifold 121a.

The water to be heated thus flows alternately in the pipes 100 and 104, and in opposite directions through adjacent coil sections A through N. The flow through sections A, C and every other alternate pipe section is opposite to the flow of the hot waste water as it travels from shell inlet 130 to the shell outlet 132, i.e., a counterflow is established. Upon completion of its travel to the last section H, the now heated water is discharged from pipe 104 through pipe 105 into the output pipe 102. From pipe 102, the water is drawn into the storage tank.

In the FIGS. 5 and 6 embodiment, the water undergoes counterflow travel every other coil section. Depending upon the requirements of the heat reclaimer, the blocking discs and coiled tubes may be rearranged to provide counterflow every two or more coil sections, or every odd number of core sections.

Tests conducted on a prototype similar to that in FIGS. 5 and 6 indicated that 60% of the embodiment of available heat in the laundry water is absorbed by the primary water.

As with the FIGS. 1 through 4 embodiment, the reclaimer of FIGS. 5 and 6 with its roll-away shell design enhances serviceability in that it is unnecessary to break pipe connections for servicing. Any coil in any coil section can be isolated (plugged) so that a failure of one or more coils will not disable the system. As with the FIGS. 1 through 4, maximization of the efficiency of the heat exchange process is achieved. Where the water to be preheated is at its coolest, namely at the input end of the primary water pipe 100, the water absorbs heat from the used laundry water just prior to the discharge of the used laundry water to the drain. Similarly, where the primary water is at its warmest, namely as it is discharged from the last coil section N, the water is in heat exchange relation with the laundry water when it is at its hottest in the heat exchanger. Thus, at all points in the reclaimer there is a temperature gradient favoring heat transfer from the warm used laundry water to the cool primary water.

Many modifications of the representative embodiment of the invention disclosed above will readily occur to those skilled in the art upon consideration of the present disclosure. For example, while the invention in the preferred embodiment disclosed is employed to reclaim heat from used laundry water, it can be employed also to reclaim heat from many other fluids in a wide variety of environments. Accordingly, the invention is to be construed as covering all embodiments thereof within the scope of the appended claims.

We claim:

1. A heat exchanger comprising duct means and shell means, said duct means providing a first space for conducting a first fluid at one temperature through said heat exchanger and said shell means enclosing said duct means so as to provide a second space therebetween for conducting a second fluid at a different temperature through said heat exchanger, said first and second spaces being isolated from each other to prevent commingling of said fluids in said heat exchanger, characterized in that said duct means comprises a plurality of coil sections through which the first fluid passes, said coil sections being arranged generally in series and being in heat transfer relation to the second fluid, each coil section comprising at least one tubular coil and means for reversing the direction of flow of the first fluid as it passes through selected ones of said coil sections and conduit means coupled to at least a selected one of the coil sections for conducting the first fluid out of the heat exchanger.

2. A heat exchanger according to claim 1 wherein said first fluid, upon admittance into said heat exchanger, is first brought into heat-exchange relation with said second fluid just prior to its exit from said heat exchanger and said second fluid, upon admittance to said heat exchanger, is first brought into heat-exchange relation with said first fluid just prior to its exit through the conduit means from said heat exchanger, so that the log mean temperature difference across said heat exchanger is maximized, thereby maximizing the efficiency of the heat-exchange process.

3. A heat exchanger according to claims 1 or 2 wherein said duct means further comprises first and second pipes selectively coupled to the ends of the tubes in each coil section, each coil section comprises a plurality of open-ended helically coiled tubes that are hydraulically in parallel, and the means for reversing comprise blocking discs inserted in at least one of said pipes for selectively directing the first fluid through the open-ended tubular coils in one direction or the other.

4. A heat exchanger according to claim 3 including first manifold means for joining the first pipe to one of the ends of each of the coiled tubes in each coil section and second manifold means for joining the second pipe to the other open ends of each of the coiled tubes in each coil section.

* * * * *

UNITED STATES PATENT AND TRADEMARK OFFICE
CERTIFICATE OF CORRECTION

PATENT NO. : 4,346,759

DATED : August 31, 1982

INVENTOR(S) : Kenneth W. Cohen and George P. Mansey

It is certified that error appears in the above—identified patent and that said Letters Patent is hereby corrected as shown below:

Col. 2, line 13, "het" should read --heat--;

Col. 3, line 30, "hsopital" should read --hospital--;

Col. 5, line 14, "BUTs" should read --BTUs--;

Col. 7, line 55, "The flow ..." should start a new paragraph;

Col. 8, line 3, delete "embodiment of"; and

Col. 8, line 11, after "the" (first occurrence) insert --embodiment of--.

Signed and Sealed this

Twenty-sixth Day of October 1982

[SEAL]

Attest:

GERALD J. MOSSINGHOFF

Attesting Officer — Commissioner of Patents and Trademarks